(12) United States Patent
Dubost et al.

(10) Patent No.: US 8,985,521 B2
(45) Date of Patent: Mar. 24, 2015

(54) DEVICE FOR GENERATING RESISTIVE TORQUE

(75) Inventors: Jerome Dubost, La Slavetat Saint Gilles (FR); Jerome Huet, Marseilles (FR)

(73) Assignee: Airbus Operations SAS, Toulouse (FR)

( * ) Notice: Subject to any disclaimer, the term of this patent is extended or adjusted under 35 U.S.C. 154(b) by 463 days.

(21) Appl. No.: 13/580,327

(22) PCT Filed: Feb. 22, 2011
(Under 37 CFR 1.47)

(86) PCT No.: PCT/FR2011/050367
§ 371 (c)(1),
(2), (4) Date: Mar. 27, 2013

(87) PCT Pub. No.: WO2011/104476
PCT Pub. Date: Sep. 1, 2011

(65) Prior Publication Data
US 2014/0174245 A1     Jun. 26, 2014

(30) Foreign Application Priority Data

Feb. 23, 2010   (FR) ...................................... 10 51288

(51) Int. Cl.
| | |
|---|---|
| B64C 13/04 | (2006.01) |
| G05G 1/40 | (2008.04) |
| B64C 13/46 | (2006.01) |
| G05G 1/30 | (2008.04) |
| G05G 5/03 | (2008.04) |

(52) U.S. Cl.
CPC ............. *G05G 1/40* (2013.01); *Y10T 74/20528* (2015.01); *B64C 13/04* (2013.01); *B64C 13/46* (2013.01); *G05G 1/30* (2013.01); *G05G 5/03* (2013.01)
USPC .............................. 244/223; 74/512; 475/331

(58) Field of Classification Search
None
See application file for complete search history.

(56) References Cited

U.S. PATENT DOCUMENTS

| | | | | | |
|---|---|---|---|---|---|
| 3,363,480 | A | * | 1/1968 | Murphy | ............................. 475/4 |
| 5,295,907 | A | * | 3/1994 | Akkerman | ....................... 464/37 |
| 6,142,036 | A | * | 11/2000 | Mizuma et al. | .................. 74/512 |
| 6,240,801 | B1 | * | 6/2001 | Kojima et al. | ................... 74/513 |

(Continued)

FOREIGN PATENT DOCUMENTS

| | | |
|---|---|---|
| EP | 0 928 727 | 7/1999 |
| EP | 1 958 870 | 8/2008 |

(Continued)

OTHER PUBLICATIONS

International Search Report dated Jul. 12, 2011.

*Primary Examiner* — Christopher P Ellis
*Assistant Examiner* — Medhat Badawi
(74) *Attorney, Agent, or Firm* — Dickinson Wright PLLC

(57) ABSTRACT

The subject of the invention is a control unit (A), which comprises actuation units (F) such as a rudder and brakes for a pilot in an aircraft, which comprises a rotating shaft (2) mobile in rotation around an axis (40); said shaft is driven in rotation when the pilot performs an action on the actuation units (F), in particular the brake pedals, by mechanical transmission between said shaft and said actuation units, and which comprises a device for generating resistive torque (1) designed to be fastened along the rotating axis of the control unit; the device for generating resistive torque comprises a friction disk (3, 4, 5) mounted axially and fastened to the rotating axle (2), a first annular track (6, 7, 8) fastened to a frame element (9) of the control unit; and means of support (10, 11, 12).

12 Claims, 4 Drawing Sheets

(56) References Cited

U.S. PATENT DOCUMENTS

| | | | |
|---|---|---|---|
| 7,614,459 B2 * | 11/2009 | Campbell et al. | 173/1 |
| 7,637,360 B2 * | 12/2009 | Carlson et al. | 188/267.2 |
| 7,779,721 B2 * | 8/2010 | Yokoyama et al. | 74/512 |
| 7,878,230 B2 * | 2/2011 | Daus et al. | 160/9 |
| 8,256,601 B2 * | 9/2012 | Braunlich et al. | 192/223.4 |
| 8,491,439 B2 * | 7/2013 | Kimes | 475/324 |
| 2006/0237959 A1 * | 10/2006 | Dimig et al. | 280/776 |
| 2011/0125367 A1 * | 5/2011 | Sakaguchi et al. | 701/36 |

FOREIGN PATENT DOCUMENTS

| | | |
|---|---|---|
| GB | 283532 | 8/1928 |
| WO | 03/068549 | 8/2003 |

* cited by examiner

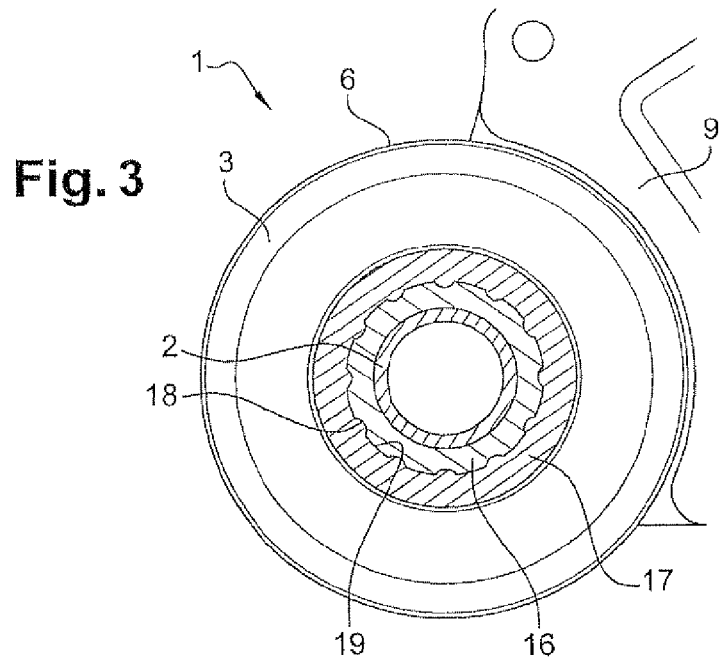
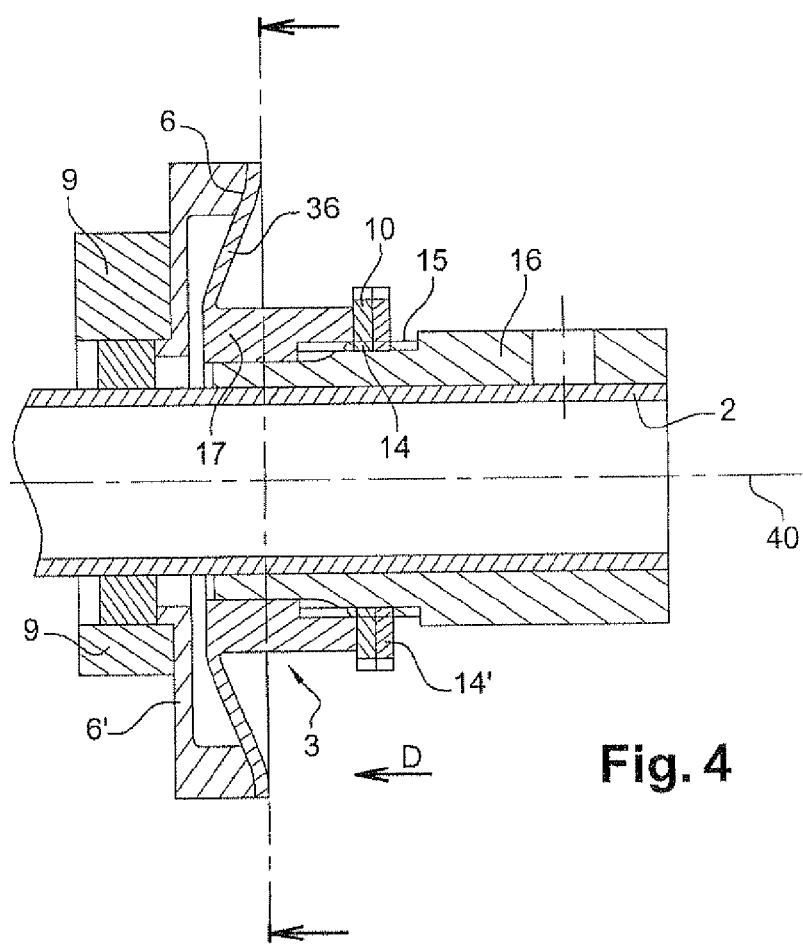

DEVICE FOR GENERATING RESISTIVE TORQUE

This invention relates to a device for generating resistive torque which, when linked to a control unit such as electrically-controlled aircraft brake pedals, is designed in particular to produce a force feedback sensation when the pilot activates the control unit.

In transport aircraft, combined rudder/brake flight control blocks are located at each of the two pilots' feet.

These two blocks are linked mechanically by connecting rods so as to coordinate the pilots' actions.

The combined blocks allow the pilots to control the rudder or the brakes independently via two pedals according to two distinct actions: push a pedal to activate the rudder or tilt the pedals downwards to activate the brakes.

Figure 1:
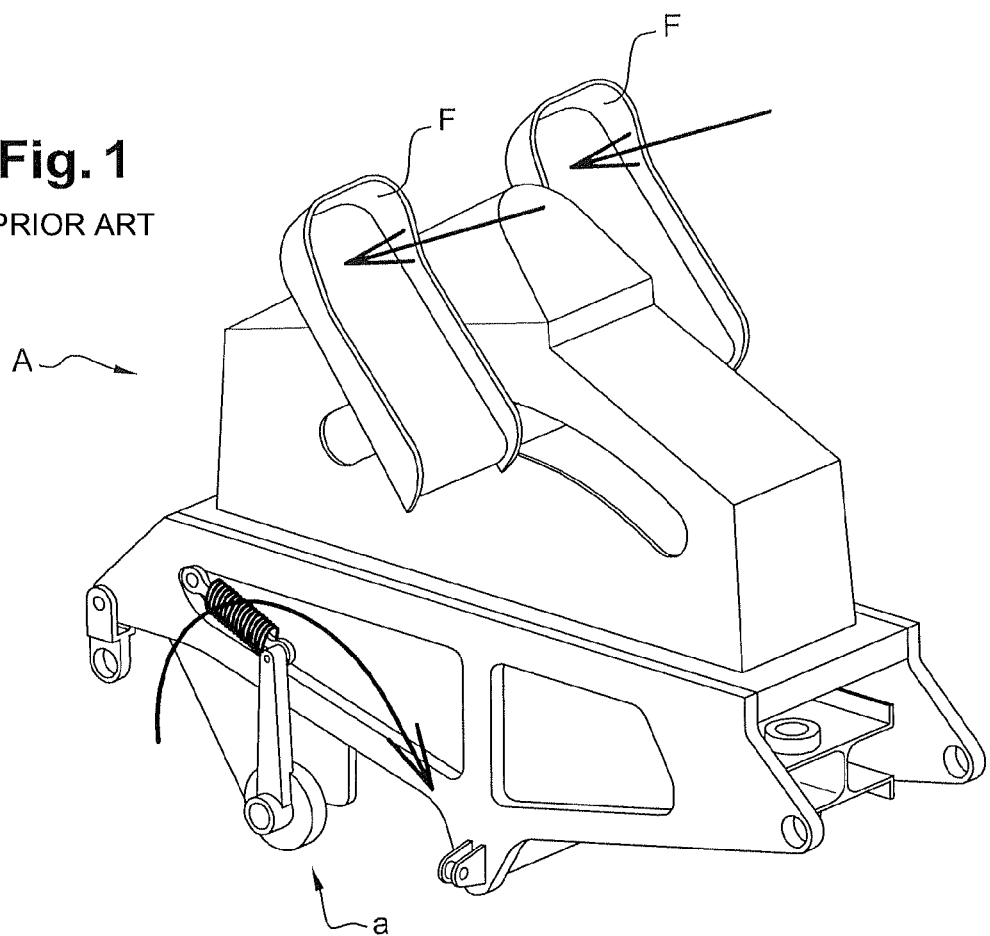

For pilots to have a sensation of resistive force when they use the brake pedals F of an aircraft with electric flight controls, i.e. in situations where there is no mechanical feedback from the controlled elements to the rudder and brake control units, a torque generator device is placed on one of the main axes of the braking control mechanism, such as the rudder/brake block shown in FIG. 1.

Figure 2:
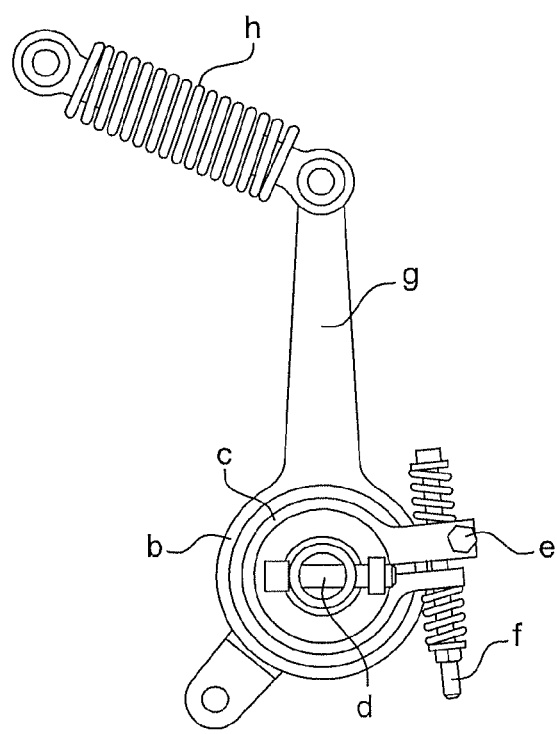

In the current state of the technology, the resistive torque is produced by the friction between two elements b, c, one against the other, as shown in FIG. 2.

A steel drum c is assembled with one of the axles of the braking mechanism and with a bellcrank g.

The circumference surface of the drum is placed in contact with a clamping ring b coated with PTFE plastic.

The circumference surface of the drum is chrome-plated to provide resistance to wear, resistance to abrasion and high quality friction.

The ring is blocked in rotation by a stop e fastened to the frame of the combined block.

The ring's clamping is adjusted via a screw f that compresses 2 cadmium-plated springs, which allow the clamping of the ring on the drum to be adjusted and substantially constant torque of the desired value to be obtained.

The bellcrank g brings the braking control system back to its initial position using the return spring h when the pilot stops pressing on the brake pedals.

The new European regulations lead to abandoning the use of chrome-plating, even though this method provides an extremely favorable friction/hardness pair, providing excellent resilience to wear by abrasion and high quality of the friction obtained.

In spite of the efforts this requires, this invention proposes a new embodiment of the device that allows the hard chrome-plating to be eliminated and heavy materials, which are likely to corrode, to be replaced by polymer materials.

To achieve this, the invention proposes a control unit comprising actuation units, such as a rudder and brakes for a pilot in an aircraft, which comprises a rotating shaft that is mobile in rotation around an axis; said shaft is driven in rotation when the pilot performs an action on the actuation units, in particular the brake pedals, by mechanical transmission between this shaft and these actuation units.

In addition, the control unit comprises a device for generating resistive torque, designed to be fastened along the axis of the rotating shaft of the control unit, which comprises a friction disk mounted axially and fastened to the rotating shaft, a first annular track fastened to a frame element of the control unit and means of support designed to maintain a first side of the friction disk pressed against the first annular track with a substantially constant support force applied in a direction parallel to the axis of the rotating shaft and of the friction disk.

According to an embodiment, the friction disk is flexible and the means of support comprise a drum with a second annular track that is pressed against a second side of the friction disk, opposite said first side.

In this case, the second annular track is advantageously offset in relation to the first track in a radial direction, so as to confine the friction disk by shearing between said first and second tracks by applying a force on the friction disk near the second annular track, which is opposite and radially distant from the first support area, so as to apply a lever-arm effect and adjust the friction force without blocking the friction disk, by tightening between the two tracks.

Since the friction disk is made of a flexible flange linked to a tubular part for assembling onto the shaft, the torque generator device preferably comprises means of adjusting the axial position of the friction disk along the axis.

More specifically, the adjustment means comprise a screw thread on an annular ring of a bellcrank to receive the friction disk, mounted on the axle and an adjustment nut that works together with the screw thread to press itself against the tubular part and adjust the axial position of said tubular part so as to adjust, via an intermediate spring, the pressure of the flexible flange of the friction disk on the first track.

To allow both an axial translation of the friction disk and the friction disk to be driven in rotation by the axle, the tubular part for assembly of the friction disk and the annular ring are fitted with complementary anti-rotation means such as splines, one or several pins parallel to the axis of the rotating shaft or even keys working together with grooves.

The second annular track is advantageously part of an annular cover that screws onto a threaded skirt that surrounds the first track so as to adjust the bending stress applied to the friction disk between said first and second tracks.

In this case, the device comprises advantageously a blocking lock-nut screwed onto the skirt, to stop the rotation of the annular cover and avoid any loosening due to vibrations.

According to an alternative embodiment, the means of support comprise an annular ring that is fixed in rotation by splines, in relation to said first annular track; a spring means designed to press the ring axially against a second side of the friction disk, opposite said first side; support element means for the spring means, e.g. realized with a stack of elastic washers called Belleville washers, designed to adjust the axial thrust of the spring means on the ring.

The annular ring advantageously fits in a crown at the edge of the flange; the ring and crown comprise complementary means of stopping in rotation such as teeth at the edge of the ring and grooves in the crown; the teeth, fitting into the grooves, allow axial travel of the ring and retention of the ring in rotation in the crown.

In this case, the friction disk is preferably made of a rigid flange attached to a sleeve for mounting the disk, which is stopped in rotation around the axis and free in translation along the axis.

Figure 5:
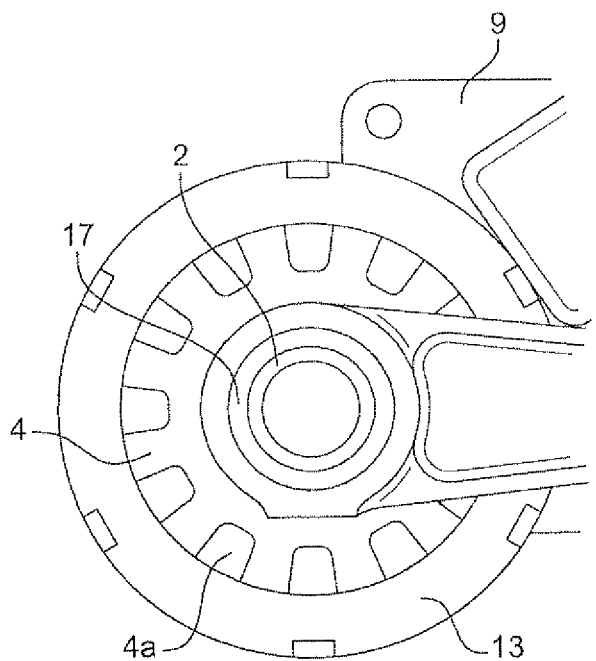
Figure 6:
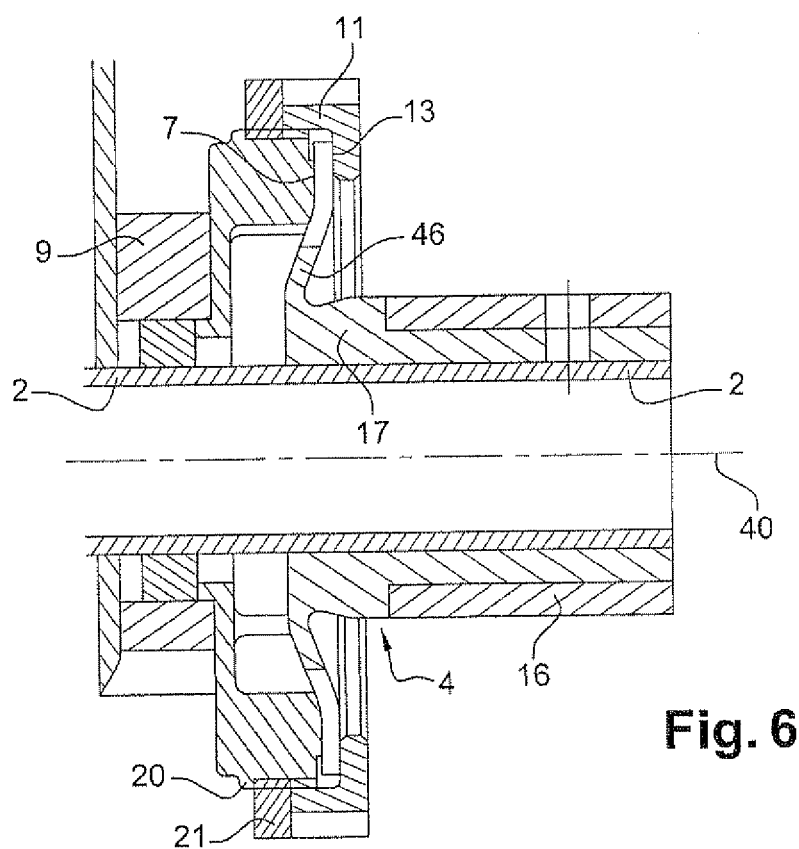
Figure 7:
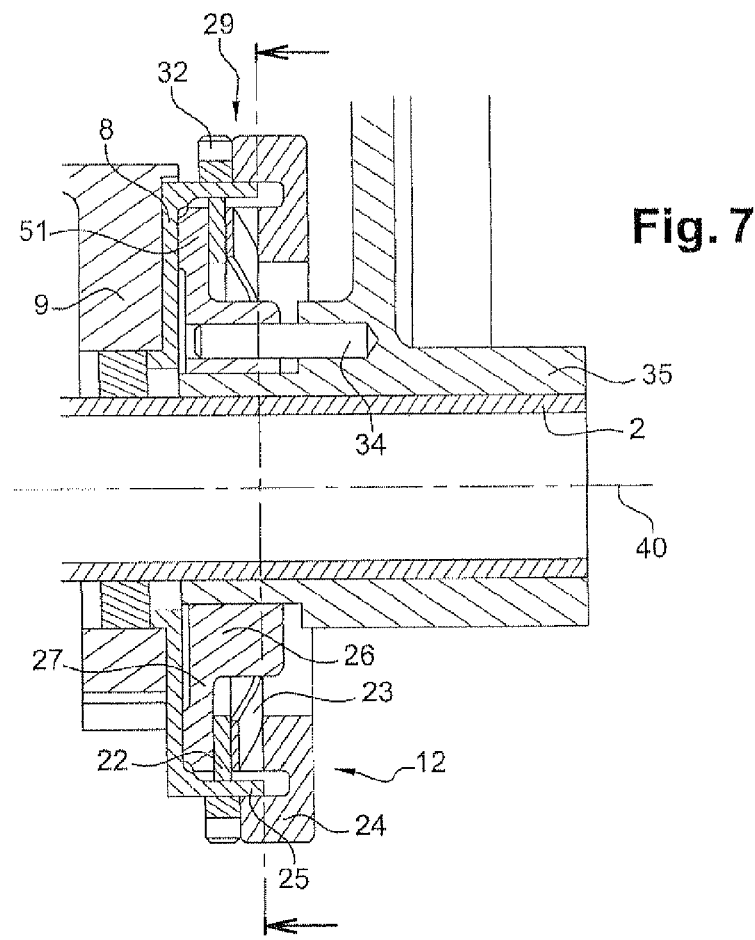
Figure 8:
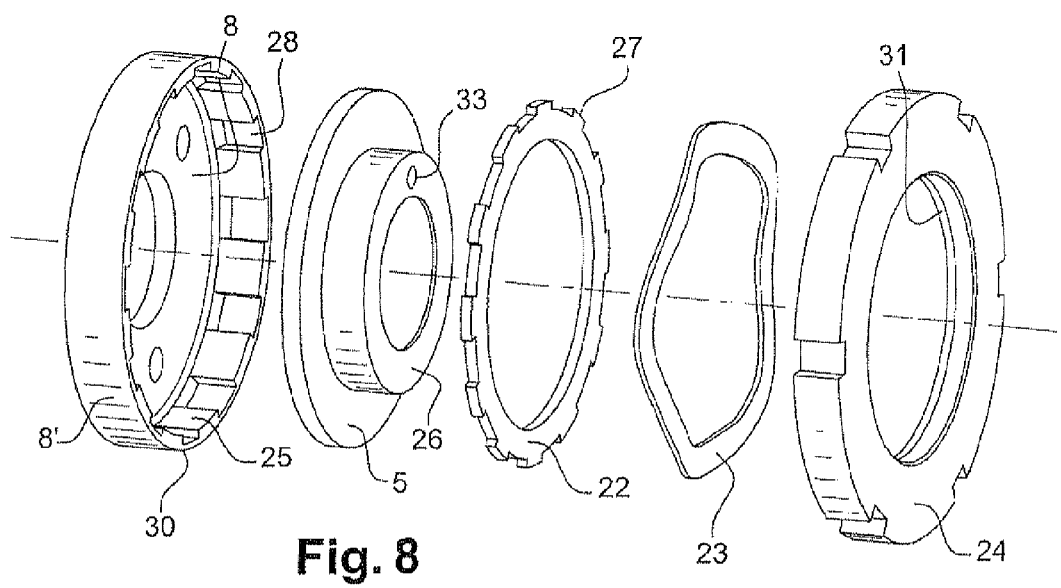

Other features and advantages of the invention are described in the following description of a non-limiting example of realization of the invention with reference to the drawings, which show:

in FIG. 1: already mentioned, a perspective view of a control unit fitted with a device for generating resistive torque of the previous state of the art;

in FIG. 2: already mentioned, a side view of the device for generating resistive torque according to the previous state of the art;

in FIG. 3: a front cross-section view of a first embodiment of a torque generator device according to the invention;

in FIG. 4: a side cross-section view of the torque generator device of FIG. 3;

in FIG. 5: a front cross-section view of a second embodiment of a torque generator device according to the invention;

in FIG. 6: a side cross-section view of the torque generator device of FIG. 5;

in FIG. 7: a side cross-section view of a third embodiment of a torque generator device according to the invention;

in FIG. 8: an exploded view of elements of the device of FIG. 7.

The invention applies in particular to brake pedals combined with rudder pedals of combined aircraft command blocks such as that shown in FIG. 1; in such a block, it replaces the device of FIG. 2.

The principle of the device of this invention consists of applying a force normal to the contact area between a rubbing contact, mounted on an axle of the control unit, and a track, so as to create resistive torque according to the formula:

$$T = N \times n \times \mu \times Req.$$

Therefore the torque T varies depending on:
the normal force N;
the number of friction surfaces n;
the friction coefficient $\mu$
the equivalent radius Req.

As in the device of the previous state of the art, an adjustment range is required to calibrate the force feedback felt by the pilot.

One solution is to adjust the normal force to obtain the desired torque.

The proposed solutions retain the general functions of the system, i.e. a friction force as constant as possible and an adjustment of the force by tightening.

To limit galvanic couples and the associated corrosion problems, the device of the invention uses mainly aluminum and polymers in the contact areas where friction is created on purpose.

The embodiment of FIGS. 3 and 4 corresponds to a device for generating resistive torque 1 designed to be fastened to a shaft 2, mobile in rotation around an axis 40, linked to the control unit and set in rotation by the action on the brake pedals F by internal control linkages so as to return the resistive torque forces towards the brake pedals.

The device 1 comprises a friction disk 3 that extends radially around the shaft and is fastened in rotation with the shaft: it comes into contact with an annular track 6 fastened to a frame element 9 of the control unit.

FIG. 3 represents a front view of the device on the shaft 2.

In FIG. 4, where the device is represented in a cutaway side view, the support means 10 are shown; these are designed to press a first side of the friction disk against the first annular track in a first direction D, parallel to the command shaft 2.

In this embodiment, the friction disk 3 comprises a side with a flexible flange 36 and a tubular frame 17 that links it to the shaft.

The support means 10 are realized by a nut 14—locknut 14' device; this allows the torque generator device to comprise, in addition, means 14, 15 of adjusting the force applied between the flange 36 of the friction disk 17 and the contact annular track, which takes the form of a screw thread 15 on an annular ring 16 of a bellcrank (not visible in FIGS. 3 and 4 and equivalent to the bellcrank g of the prior state of the art of FIG. 2) used to receive the friction disk.

Splines are used to support driving the friction disk 3 in rotation by the annular ring 16, without preventing said disk from sliding on said ring.

Thus, the nut 14 constitutes an adjustment nut that works together with the screw thread 15 to press against the tubular part and adjust the axial position of said tubular part, which adjusts the pressure exerted by the flexible flange of the friction disk on the first track.

In an advantageous form of realization, the friction surface of the annular track 6 is toric, rather than plane, and the flange 36 of the friction disk 3 also has a toric cross-section once pressed up against the annular track, which improves the application of the friction surfaces of the annular track onto the friction disk.

The friction occurs on an area located between an outer radius of the friction area, advantageously the outer radius of the annular track 6, and an inner radius of the friction area.

The equivalent radius Req is then considered to be an intermediate value, e.g. the geometric mean value of the outer and inner radii of the friction area.

In this way, the normal force can be adjusted and, therefore, so can the resistive torque of the device which is substantially constant whatever the angular position of the shaft 2, in particular because the normal force remains constant when the position around the shaft 40 is modified.

The track 6 is, for example, realized at the edge of a flange 6' fastened to the frame 9 as shown in FIG. 4.

Back to FIG. 3, the means selected to make the disk fixed in rotation to the shaft consists of making additional splines 18, 19 at the contact surface between the tubular frame 17 for mounting the friction disk and the annular ring 16 of the bellcrank.

This embodiment, which comprises a single friction area between a flange and a friction disk, utilizes a relatively low number of parts, making it simple to manufacture.

The flange 36 of this rubbing contact is specifically of low thickness to contribute a certain amount of flexibility and to act as a spring.

The rubbing contact's tubular frame is driven in rotation by the shaft by means of the splines on said tubular frame and on the annular ring 16 of the bellcrank and moves in translation along this last, depending on the tightening of the adjustment nuts 14, 14'.

The thickness and the polymer material of the friction disk 3 are adjusted according to the normal force and the desired adjustment range, as well as the desired friction coefficient.

A PTFE-loaded polymer is particularly suited to the realization of the flange for its characteristic of resilience over time.

This principle uses a small number of parts but requires a higher normal force in comparison to solutions with double contact areas, as described below.

The solution represented in FIGS. 5 and 6 corresponds to an embodiment for which a friction disk 4 is also a flexible disk near a flange 46, and for which the support means pressing the friction disk against the first track comprise an annular cover 11, fitted with a second annular track 13, pressing on a second side of the friction disk opposite said first side.

According to this embodiment, as represented in FIG. 6, the second annular track 13 is offset in relation to the first track 7 in a radial direction, so as to increase the pressing force of the friction surfaces on the friction disk 3 without requiring an increase in the axial force onto said friction disk.

To adjust the friction stress applied on the tracks the friction disk between the first and second tracks, the second annular track 13 is, according to the example represented, part of an annular cover 11 that screws onto a threaded skirt 20 surrounding the first track.

A locknut 21 is screwed onto the skirt so as to block the cover in rotation and prevent any unwanted loosening, in particular due to vibrations.

An advantage of this solution is that the annular cover 11 protects the friction disk 4.

This embodiment with two contact surfaces is an improvement on the first embodiment.

The two friction surfaces on either side of the friction disk 4, made up of the first and second tracks 7 and 13, whose equivalent radii are different, allow the normal force applied in the direction of the axis 40 to be reduced by using a lever-arm principle.

The flexibility of the rubbing contact, which is also toric in this mode of realization, is provided by the flexible disk 4.

This disk may possibly be perforated 4a, like a diaphragm.

The normal force is adjusted by screwing or unscrewing the annular cover 11.

When the annular cover 11 is screwed onto the flange that bears the first annular track 7, the force exerted by said cover on an outer peripheral edge of the rubbing contact near the second annular track 13 deforms the flexible flange by a lever-arm effect in relation to a support area of said flexible flange on the first annular track 7, which is offset radially in the direction of the axis 40 of the shaft 2 in relation to the outer peripheral edge of the rubbing contact.

As in the first embodiment, the disk is preferably made of a polymer material and its thickness is suited to the forces it has to withstand or, if the forces to be applied justify this, it is made of a metallic material such as an aluminum alloy, and its tracks, which are subjected to the friction forces are made of a polymer material, e.g. PTFE, and attached to the metal part.

A third embodiment is described with reference to FIGS. 7 and 8.

In this embodiment, a friction disk 5 is sandwiched between two annular tracks.

According to FIG. 8 in particular, the first track 8 is realized by a flange 8' fastened to the frame 9 and the second track is realized by a side 38 of an annular ring 22.

The annular ring 22 is fixed in rotation in relation to the first annular track and, so as to fasten these two elements in rotation, the annular ring comprises, according to the example, means such as index teeth 27 on its periphery.

These index teeth fit into grooves 28 of a crown 25 on the periphery of the flange 8' that bears the first track 8.

The index teeth 37 of the ring 22 and the grooves of the crown 25 make up means of stooping the ring in rotation that, in contrast, allow the annular ring to travel axially in relation to the crown.

A spring means 23, advantageously one or several stacked elastic washers, of Belleville washer type, or a corrugated washer as illustrated, is designed to push the ring axially against a second side 52 of the friction disk 5, opposite a first side 51 of the friction disk in contact with the first track 8.

A stopping means 24 for supporting the spring means 23 is designed to adjust the axial thrust of the spring means on the annular ring 22.

The annular ring 22, the spring means 23 and the supporting stop 24 make up support means that press the friction disk 5 up against the first track 8.

The supporting stop 24 is realized in a bell 29 that is screwed onto the crown 25 by means of complementary threads 30, 31.

A locknut 32, screwed onto the threads of the crown, provides the locknut function in relation to the bell 29 and prevents unwanted loosening in particular due to vibrations.

With reference to FIG. 7, the friction disk 5 is made of a rigid flange linked to a sleeve 26 for mounting the disk, which is stopped in rotation on the shaft and free in translation on the shaft.

Stopping the friction disk 5 in rotation in relation to the hub 35 can be realized by splines or, as per the solution illustrated in FIG. 7, realized by a cylindrical rod 34 or pin sliding in a hole 33 in the sleeve 26; the rod 34 comes out of the bellcrank's hub 35 fastened to the shaft 2.

This embodiment retains the functions expected of the device.

The rubbing contact is mobile along the shaft but blocked in rotation at the bellcrank and at its hub 35 by the cylindrical pin 34.

This solution, which utilizes a greater number of parts than other embodiments, has the advantage of not generating any traction/compression forces in the direction of the main axis. Only the friction coefficient and resistance characteristics need be taken into consideration in choosing the material for the rubbing contact.

The invention is not limited to the examples shown and in particular the means of stopping the disk in rotation can be exchanged between the various embodiments while still remaining within the framework of the invention defined by the claims.

The invention claimed is:

1. A control unit, which comprises:
   actuation units for a pilot in an aircraft, which comprises a rotating shaft mobile in rotation around an axis; said shaft is driven in rotation by an action of the pilot on the actuation units by mechanical transmission between said shaft and said actuation units; and
   a device for generating resistive torque structured to be fastened along the rotating axis of the control unit;
   characterized in that the device for generating resistive torque comprises:
   a friction disk, mounted axially and fastened to the rotating axle;
   a first annular track fastened to a frame element of the control unit; and
   a support structured to keep a first side of the friction disk pressed against the first annular track with a substantially constant pressing force exerted in a direction parallel to the axis of the rotating shaft and of the friction disk, wherein:
   the geometry of the friction disk comprises a flexible flange side and a tubular frame that links it to the shaft; and
   the torque generator device comprises an adjuster that adjusts the axial position of the friction disk on the axis.

2. The control unit according to claim 1, characterized in that the friction disk is flexible and in that the support comprises a drum with a second annular track which is pressed against a second side of the friction disk, opposite said first side.

3. The control unit according to claim 2, characterized in that the second annular track is offset in relation to the first track in a radial direction, so as to confine the friction disk between said first and second tracks by applying a force on the friction disk at the second annular track, which is opposite and radially distant from the first support area, so as to apply a lever arm effect.

4. The control unit according to claim 1, characterized in that the adjuster comprises a screw thread on an annular ring of a bell crank to receive the friction disk, mounted on the axle and an adjustment nut that works together with the screw thread to press against the tubular part and adjust the axial position of said tubular part to adjust the pressure exerted by the flexible flange of the friction disk on the first track.

5. The control unit according to claim 4, characterized in that the tubular part for assembling the friction disk and the annular ring are fitted with a complementary structure that allows both an axial translation of the friction disk and the friction disk to be driven in rotation by the axle.

6. The control unit according to claim 3, characterized in that the second annular track is part of an annular cover that screws onto a threaded skirt surrounding the first track so as to adjust the bending stress applied to the friction disk between said first and second tracks and in that the device comprises a blocking lock-nut screwed onto the skirt to stop the rotation of the annular cover.

7. The control unit according to claim 1, characterized in that the support comprises an annular ring fixed in rotation in relation to said first annular track; a spring structured to press the ring axially against a second side of the friction disk, opposite said first side; and a supporting stop for the spring structured to adjust the axial pressing of the spring on the ring.

8. The control unit according to claim 7, characterized in that the annular ring fits in a crown at the periphery of the flange; the ring and crown comprise a complementary rotation stop; the teeth, fitting into the grooves, allow axial travel of the ring and retention of the ring in rotation in the crown.

9. The control unit according to claim 7, characterized in that the friction disk is made of a rigid flange linked to a sleeve for mounting the disk, which is stopped in rotation on the axis and free in translation on the axis.

10. The control unit according to claim 1, wherein said actuation units comprise a rudder and brakes and said shaft is driven in rotation by an action of the pilot on the brake pedals of the brakes.

11. The control unit according to claim 5, wherein said complementary structure comprises splines.

12. The control unit according to claim 8, wherein said rotation stop comprises teeth at the edge of the ring and grooves in the crown.

* * * * *